(12) United States Patent
Lin et al.

(10) Patent No.: US 8,907,649 B2
(45) Date of Patent: Dec. 9, 2014

(54) VOLTAGE CONVERTER HAVING AN ADJUSTABLE OUTPUT

(75) Inventors: Ho-Feng Lin, New Taipei (TW); Chuang-Wei Tseng, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 558 days.

(21) Appl. No.: 13/197,788

(22) Filed: Aug. 4, 2011

(65) Prior Publication Data

US 2012/0146596 A1 Jun. 14, 2012

(30) Foreign Application Priority Data

Dec. 13, 2010 (TW) ................................. 99143415 A

(51) Int. Cl.
*H02M 3/156* (2006.01)
*H02M 1/00* (2006.01)

(52) U.S. Cl.
CPC ...... *H02M 3/156* (2013.01); *H02M 2001/0032* (2013.01); *Y02B 70/16* (2013.01); *H02M 2001/0025* (2013.01); *H02M 2001/0009* (2013.01)
USPC .......................................... 323/285; 323/288

(58) Field of Classification Search
USPC ......................................... 323/282–285, 288
See application file for complete search history.

(56) References Cited

U.S. PATENT DOCUMENTS

| | | | | |
|---|---|---|---|---|
| 5,691,628 A | * | 11/1997 | Martin | 323/237 |
| 7,292,014 B2 | * | 11/2007 | Lee et al. | 323/266 |
| 2009/0001952 A1 | * | 1/2009 | Chang et al. | 323/280 |
| 2009/0153124 A1 | * | 6/2009 | Ishii | 323/290 |
| 2010/0066328 A1 | * | 3/2010 | Shimizu et al. | 323/282 |
| 2010/0219803 A1 | * | 9/2010 | Han et al. | 323/284 |
| 2010/0308654 A1 | * | 12/2010 | Chen | 307/31 |
| 2012/0038345 A1 | * | 2/2012 | Poremba et al. | 323/369 |

OTHER PUBLICATIONS

Tapley, B.D. & Poston, T.R., eds. (1990). Esbach's Handbook of Engineering Fundamentals, 4th ed. Ch. 12, p. 114. New York: Wiley & Sons.*

\* cited by examiner

*Primary Examiner* — Fred E Finch, III
(74) *Attorney, Agent, or Firm* — Novak Druce Connolly Bove + Quigg LLP

(57) ABSTRACT

A voltage converter includes a voltage converting circuit, a pulse width modulation (PWM) controller, a feedback circuit, an adjusting circuit, and a measuring circuit. The voltage converting circuit converts an input voltage to a low output voltage for a load. The PWM controller includes a comparator and a triangular-wave oscillator. The comparator is connected to the voltage converting circuit and outputs a PWM voltage to the voltage converting circuit. The triangular-wave oscillator is connected to an inverting terminal of the comparator, and outputs a sawtooth-wave voltage to the comparator. The feedback circuit is connected to a non-inverting terminal of the comparator and outputs a feedback voltage to the comparator. The measuring circuit measures current output from the voltage converting circuit and controls the adjusting circuit to provide a pull-up voltage to the triangular-wave oscillator when the measured current decreases, thereby increasing the duty ratio of the PWM voltage.

18 Claims, 5 Drawing Sheets

VOLTAGE CONVERTER HAVING AN ADJUSTABLE OUTPUT

BACKGROUND

1. Technical Field

The disclosure generally relates to voltage converters, and particularly to a voltage converter having a stable output.

2. Description of Related Art

Referring to FIG. 4, a typical voltage converter 90 is used to convert an input voltage V1 to an output voltage V2 for a load.

Referring to FIGS. 4 and 5, the triangular-wave oscillator 4 outputs a sawtooth-waveform voltage V3 to a comparator 5. The feedback circuit 3 outputs a feedback voltage V4 converted from the output voltage V2. The comparator 5 compares the sawtooth-waveform voltage V3 with the feedback voltage V4 and outputs a PWM signal Vp. The output voltage V2 and the input voltage V1 are calculated with the formula V2/V1=D, where D denotes the duty ratio of the PWM signal Vp. Thus, the output voltage V2 can be adjusted by changing the duty ratio of the PWM signal Vp.

However, when a heavy or full load is connected to the voltage converter 90, current output from the voltage converter 90 becomes low, which may pull down the output voltage V2 to be lower than a desired voltage value and has negative influence on the stability of the output voltage V2.

Therefore, there is room for improvement within the art.

BRIEF DESCRIPTION OF THE DRAWINGS

Many aspects of the present embodiment can be better understood with reference to the following drawings. The components in the drawings are not necessarily drawn to scale, the emphasis instead being placed upon clearly illustrating the principles of the present embodiment.

DETAILED DESCRIPTION

Figure 1:
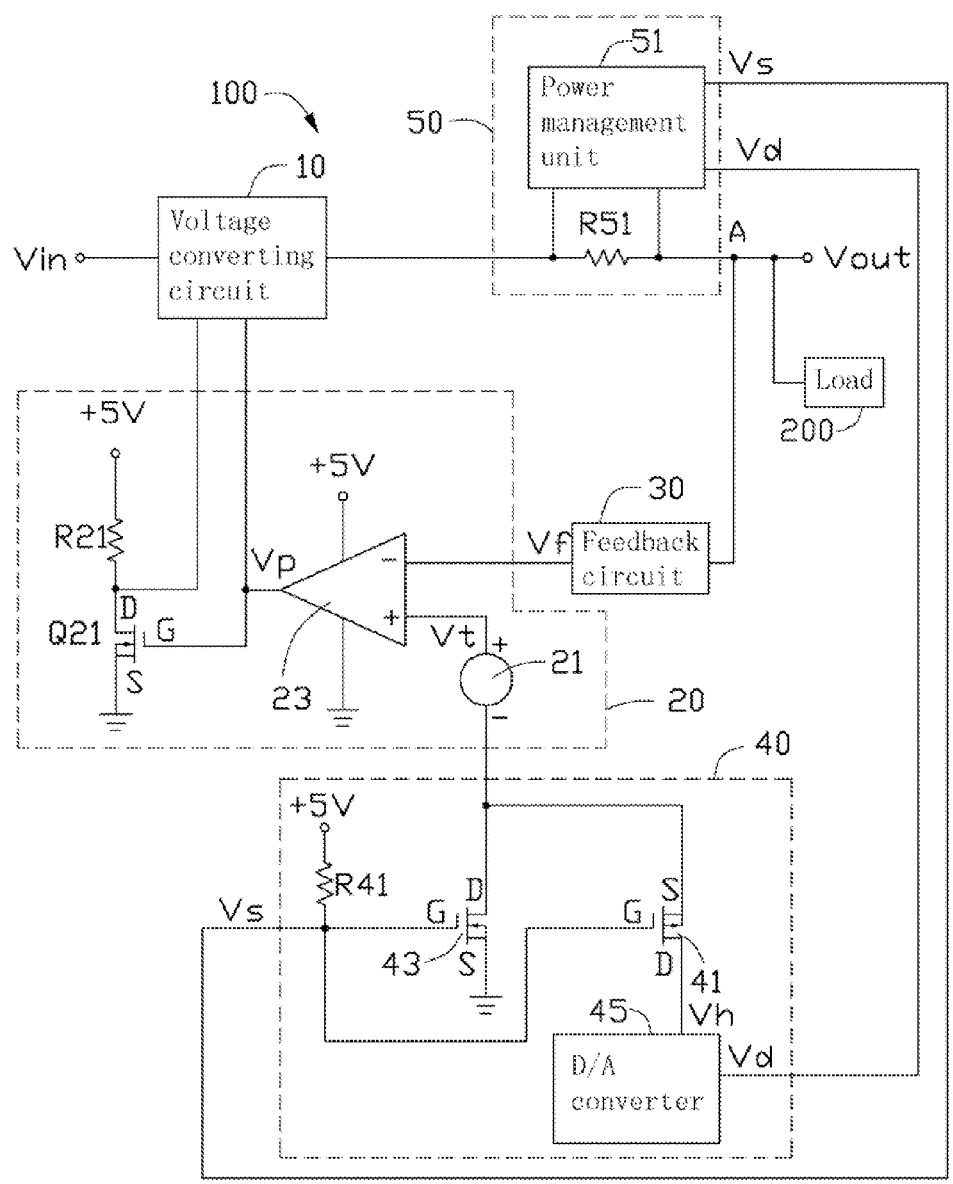
FIG. 1 is a circuit diagram of a voltage converter, according to an exemplary embodiment.
Figure 2:
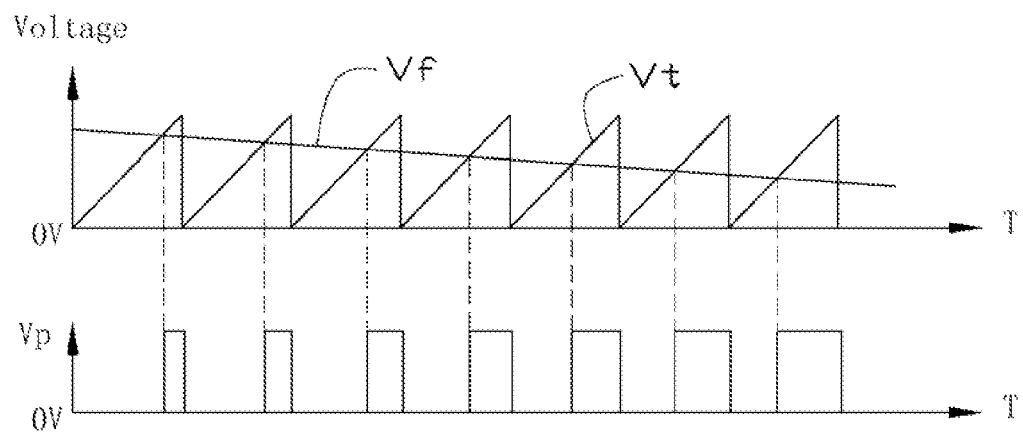
FIG. 2 is a waveform view of a PWM signal of the voltage converter of FIG. 1, when a normal load is connected to the voltage converter.

Referring to FIGS. 1 and 2, a voltage converter 100, according to an exemplary embodiment, includes a voltage converting circuit 10, a PWM controller 20, a feedback circuit 30, an adjusting circuit 40, and a measuring circuit 50.

The voltage converting circuit 10 is connected to an input voltage Vin and converts the input voltage Vin into a low output voltage Vout for a load 200.

The PWM controller 20 includes a triangular-wave oscillator 21, a comparator 23, and a first MOSFET Q21. An anode of the triangular-wave oscillator 21 is connected to the comparator 23. A cathode of the triangular-wave oscillator 21 is connected to the adjusting circuit 40. The triangular-wave oscillator 21 outputs a sawtooth-waveform voltage Vt to the comparator 23.

A non-inverting input terminal of the comparator 23 is connected to the node of the triangular-wave oscillator 21. An inverting input terminal of the comparator 23 is connected to the feedback circuit 30. An output terminal of the comparator 23 is connected to a gate G of the first MOSFET Q21.

A drain of the first MOSFET Q21 is connected to a power supply 5V by a resistor R21. A source of the first MOSFET Q21 is grounded. The drain D of the first MOSFET Q21 is connected to the voltage converting circuit 10. The drain D of the first MOSFET Q21 and the output terminal of the comparator 23 are connected to the voltage converting circuit 10.

One end of the feedback circuit 30 is connected to an output node A between the voltage converting circuit 10 and the load 200. Another end of the feedback circuit 30 is connected to the inverting terminal of the comparator 23. The feedback circuit 30 converts the output voltage Vout to a feedback voltage Vf and outputs the feedback voltage Vf to the inverting terminal of the comparator 23.

The comparator 23 compares the sawtooth-waveform voltage Vt with the feedback voltage Vf and outputs a PWM voltage Vp based on the comparison. The output voltage Vout and the input voltage Vin are calculated with the formula Vout/Vin=D, wherein, D denotes the duty ratio of the PWM voltage Vp. Thus, the output voltage Vout can be adjusted by changing the duty ratio D of the PWM voltage Vp.

The adjusting circuit 40 includes a first switch 41, a second switch 43, a digital/analog (D/A) converter 45, and a second resistor R41. In this embodiment, the first switch 41 is a P-channel MOSFET, and the second switch 43 is an N-channel MOSFET. A source of the first switch 41 is connected to the cathode of the triangular-wave oscillator 21. A gate of the first switch 41 is connected to the power supply 5V by the second resistor R41. A drain of the first switch 41 is connected to the D/A converter 45.

A gate of the second switch 43 is connected to the power supply 5V by the second resistor R41. A source of the second switch 43 is grounded. A drain of the second switch 43 is connected to the cathode of the triangular-wave oscillator 21. The measuring circuit 50 controls the D/A converter 45 to output a pull-up voltage.

When the first switch 41 is turned off, the second switch 43 is turned on, and the cathode of the triangular-wave oscillator 21 is grounded. When the first switch 41 is turned on, the second switch 43 is turned off, the D/A converter 45 is connected to the cathode of the triangular-wave oscillator 21, and the pull-up voltage is applied to the triangular-wave oscillator 21. The duty ratio D of the PWM signal Vp is increased. Thus, the output voltage Vout is increased, and cannot be pulled down.

The measuring circuit 50 includes a power management unit 51 and a measuring resistor R51. The power management unit 51 is connected to the gates of the first and second switches 41, 43, and to the D/A converter 45. The measuring resistor R51 is connected between the voltage converting circuit 10 and the load 200 in series and also connected to the power management unit 51.

A reference current value, a plurality of current value ranges, and a plurality of control voltages Vd are all pre-stored in the power management unit 51. The current value ranges respectively correspond to the control voltages Vd. Each control voltage Vd can control the D/A converter 45 to output a corresponding pull-up voltage Vh which can be applied to the triangular-wave oscillator 21.

Figure 3:
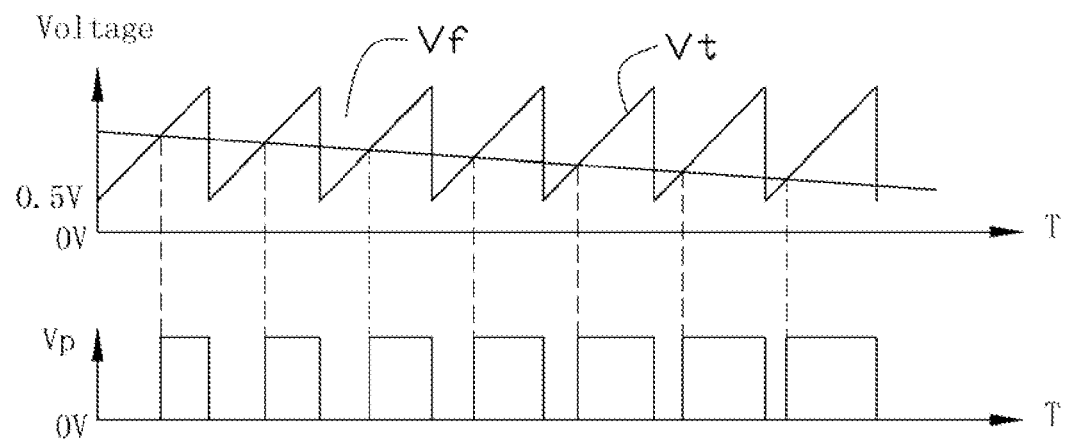
FIG. 3 is similar to FIG. 2, but showing a waveform view of the PWM signal of the voltage converter of FIG. 1, when a heavy load is connected to the voltage converter.
Figure 4:
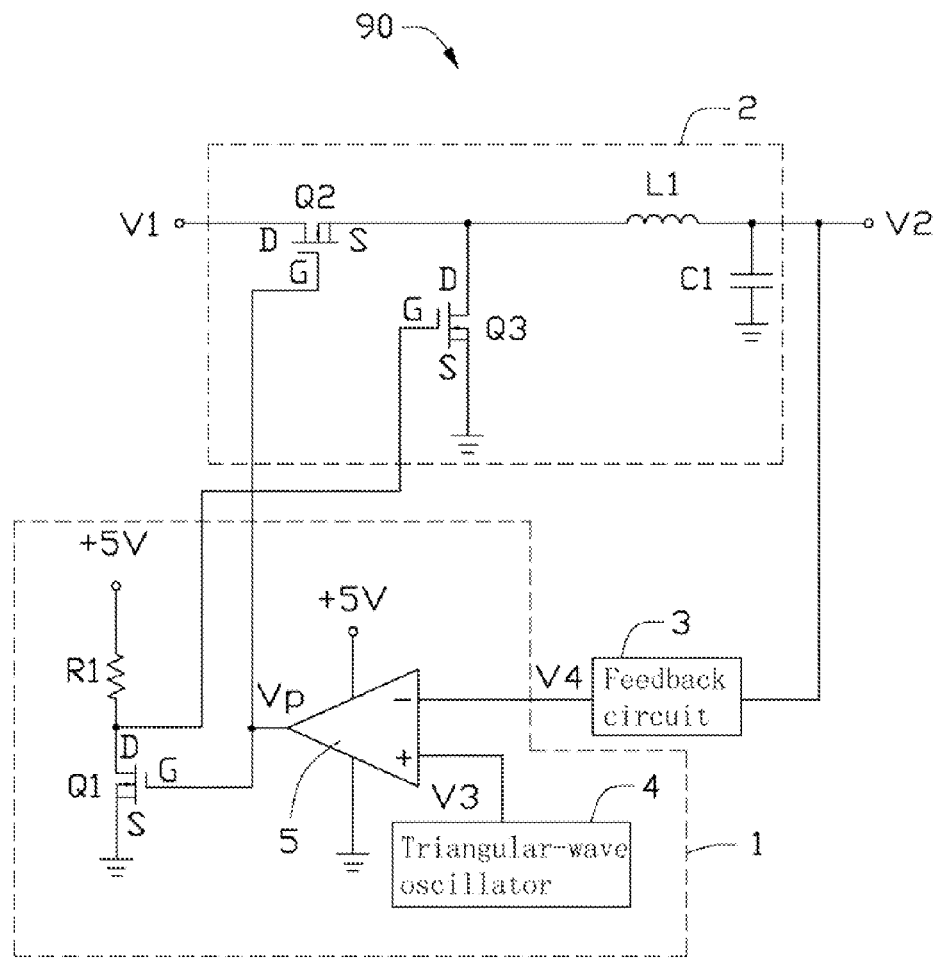
FIG. 4 is a circuit diagram of a typical voltage converter.
Figure 5:
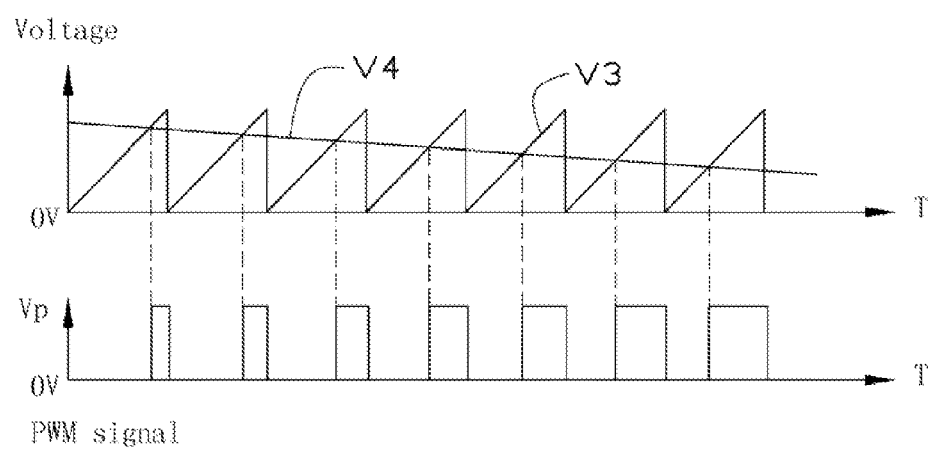
FIG. 5 is a waveform view of a PWM signal of typical voltage converter of FIG. 4 when a normal load is connected to the voltage converter.

The power management unit 51 measures current flowing through the measuring resister R51 and compares the measured current value with the reference current value. When the load 200 changes from a light load to a heavy load, the power management unit 51 obtains a current value difference between the measured current value and the reference current value. The power management unit 51 identifies which current value range the current value difference belongs to and sends the corresponding control voltage Vd to the D/A converter 45. Then, the power management unit 51 outputs a switch signal Vs to control states of the first and second switches 41, 43. The D/A converter 45 outputs a corresponding pull-up voltage to the triangular-wave oscillator 21. Referring to FIGS. 2 and 3, therefore, the duty ratio D of the PWM voltage Vp is increased, and the output voltage Vout is stably maintained, and not be affected by the load 200.

The voltage converter 100 measures the current output from the voltage converting circuit 10, and applies the pull-up voltage to the comparator 23 using the adjusting circuit 40 to increase the duty ratio of the PWM voltage Vp when the load 200 becomes heavier. Therefore, the output voltage Vout is increased to adapt to the changed load 200. And the reverse is true for when the load 200 becomes lighter.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A voltage converter, comprising:
   a voltage converting circuit that converts an input voltage into a low output voltage for a load;
   a pulse width modulation (PWM) controller, comprising:
   a comparator connected to the voltage converting circuit and outputting a PWM voltage to the voltage converting circuit; and
   a triangular-wave oscillator connected to a non-inverting terminal of the comparator, and outputting a sawtooth-wave voltage to the non-inverting terminal of the comparator;
   a feedback circuit connected to an inverting terminal of the comparator, and outputting a feedback voltage to the inverting terminal of the comparator;
   an adjusting circuit; and
   a measuring circuit comprising:
   a measuring resistor set between the voltage converting circuit and the load; and
   a power management unit connected to the measuring circuit; wherein the power management unit measures current flowing through the measuring resistor and controls the adjusting circuit to provide a pull-up voltage to the triangular-wave oscillator when the measured current decreases causing a duty ratio of the PWM voltage to increase;
   wherein the adjusting circuit comprises a first switch, a second switch and a pull-up voltage, the pull-up voltage is connected to the triangular-wave oscillator by the first switch, the second switch is set between the triangular-wave oscillator and ground; and wherein when the first switch is turned on, the second switch is turned off, and the pull-up voltage is applied to the triangular-wave oscillator.

2. The voltage converter of claim 1, wherein the power management unit controls states of the first and second switches according to the measured current value.

3. The voltage converter of claim 2, wherein the power management unit includes a reference current value, the power management unit compares the measured current value with the reference current value; and wherein when the load increases, the power management unit obtains a current value difference and controls the adjusting circuit to provide the pull-up voltage to the triangular-wave oscillator.

4. The voltage converter of claim 3, wherein the power management unit further includes a plurality of current value ranges, and a plurality of control voltages corresponding to the current value range; wherein the adjusting circuit further includes a digital/analog (D/A) converter; and wherein the power management identifies to which current value range the current value difference belongs and sends the corresponding control voltage to the D/A converter, and the D/A converter outputs the pull-up voltage.

5. The voltage converter of claim 1, wherein the first switch is an N-channel metallic oxide semiconductor field effect transistor (MOSFET), a source of the first switch is connected to a cathode of the triangular-wave oscillator, a gate of the first switch is connected to a power supply, and a drain of the first switch is connected to the pull-up voltage.

6. The voltage converter of claim 1, wherein the second switch is a P-channel MOSFET, a gate of the second switch is connected to the power supply, a source of the second switch is grounded, and a drain of the second switch is connected to the cathode of the triangular-wave oscillator.

7. The voltage converter of claim 1, wherein one end of the feedback circuit is connected to an output node between the voltage converting circuit and the load, another end of the feedback circuit is connected to the inverting terminal of the comparator, and the feedback circuit converts the output voltage to the feedback voltage.

8. A voltage converter, comprising:
   a voltage converting circuit that converts an input voltage into a low output voltage for a load;
   a pulse width modulation (PWM) controller, comprising:
   a comparator connected to the voltage converting circuit and outputting a PWM voltage to the voltage converting circuit; and
   a triangular-wave oscillator connected to a non-inverting terminal of the comparator, and outputting a sawtooth-wave voltage to the non-inverting terminal of the comparator;
   a feedback circuit connected to an inverting terminal of the comparator, and outputting a feedback voltage to the inverting terminal of the comparator;
   an adjusting circuit; and
   a measuring circuit comprising:
   a measuring resistor set between the voltage converting circuit and the load; and
   a power management unit connected to the measuring circuit, the power management unit comprising a reference current value; wherein the power management unit measures current flowing through the measuring resistor and compares the measured current value with the reference current value; and wherein when the load increases, the power management unit obtains a current value difference and controls the adjusting circuit to provide a pull-up voltage to the triangular-wave oscillator causing a duty ratio of the PWM voltage to increase;
   wherein the adjusting circuit includes a first switch, a second switch and a pull-up voltage, the pull-up voltage is connected to the triangular-wave oscillator by the first switch, and the second switch is set between the triangular-wave oscillator and ground; and wherein when the first switch is turned on, the second switch is turned off, and the pull-up voltage is applied to the triangular-wave oscillator.

9. The voltage converter of claim 8, wherein the power management unit further includes a plurality of current value ranges, and a plurality of control voltages corresponding to the current value range; wherein the adjusting circuit further includes a digital/analog (D/A) converter; and wherein the power management identifies to which current value range the current value difference belongs and sends the corresponding control voltage to the D/A converter, and the D/A converter outputs the pull-up voltage.

10. The voltage converter of claim 8, wherein the first switch is an N-channel metallic oxide semiconductor field effect transistor (MOSFET), a source of the first switch is connected to a cathode of the triangular-wave oscillator, a gate of the first switch is connected to a power supply, and a drain of the first switch is connected to the pull-up voltage.

11. The voltage converter of claim 8, wherein the second switch is a P-channel MOSFET, a gate of the second switch is connected to the power supply, a source of the second switch is grounded, and a drain of the second switch is connected to the cathode of the triangular-wave oscillator.

12. A voltage converter, comprising:
   a voltage converting circuit that converts an input voltage into a low output voltage for a load;
   a pulse width modulation (PWM) controller, comprising:
      a comparator connected to the voltage converting circuit and outputting a PWM voltage to the voltage converting circuit; and
      a triangular-wave oscillator connected to a non-inverting terminal of the comparator, and outputting a sawtooth-wave voltage to the non-inverting terminal of the comparator;
      a feedback circuit connected to an inverting terminal of the comparator, and outputting a feedback voltage to the inverting terminal of the comparator;
      an adjusting circuit, the adjusting circuit comprising:
         a first switch;
         a pull-up voltage connected to the triangular-wave oscillator by the first switch; and
         a second switch set between the triangular-wave oscillator and ground; and
      a measuring circuit measuring current output from the voltage converting circuit and controlling the adjusting circuit to provide a pull-up voltage to the triangular-wave oscillator by turning on the first switch and turning off the second switch when the measured current decreases causing a duty ratio of the PWM voltage to increase.

13. The voltage converter of claim 12, wherein the measuring circuit includes a measuring resistor set between the voltage converting circuit and the load and a power management unit connected to the measuring circuit, and the power management unit measures current flowing through the measuring resistor and controls states of the first and second switches according to the measured current value.

14. The voltage converter of claim 13, wherein the power management unit includes a reference current value, and the power management unit compares the measured current value with the reference current value; and wherein when the load increases, the power management unit obtains a current value difference and controls the adjusting circuit to provide the pull-up voltage to the triangular-wave oscillator.

15. The voltage converter of claim 14, wherein the power management unit further includes a plurality of current value ranges, and a plurality of control voltages corresponding to the current value range; wherein the adjusting circuit further includes a digital/analog (D/A) converter; and wherein the power management identifies to which current value range the current value difference belongs and sends the corresponding control voltage to the D/A converter, and the D/A converter outputs the pull-up voltage.

16. The voltage converter of claim 12, wherein the first switch is an N-channel metallic oxide semiconductor field effect transistor (MOSFET), a source of the first switch is connected to a cathode of the triangular-wave oscillator, a gate of the first switch is connected to a power supply, and a drain of the first switch is connected to the pull-up voltage.

17. The voltage converter of claim 12, wherein the second switch is a P-channel MOSFET, a gate of the second switch is connected to the power supply, a source of the second switch is grounded, and a drain of the second switch is connected to the cathode of the triangular-wave oscillator.

18. The voltage converter of claim 12, wherein one end of the feedback circuit is connected to an output node between the voltage converting circuit and the load, another end of the feedback circuit is connected to the inverting terminal of the comparator, and the feedback circuit converts the output voltage to the feedback voltage.

\* \* \* \* \*